United States Patent [19]

Savinell et al.

[11] Patent Number: 4,784,924
[45] Date of Patent: Nov. 15, 1988

[54] METAL-HALOGEN ENERGY STORAGE DEVICE AND SYSTEM

[75] Inventors: Robert F. Savinell, Akron; Chung-Chiun Liu, Cleveland, both of Ohio

[73] Assignee: University of Akron, Akron, Ohio

[21] Appl. No.: 613,370

[22] Filed: May 23, 1984

Related U.S. Application Data

[63] Continuation of Ser. No. 449,524, Dec. 13, 1982, abandoned, which is a continuation-in-part of Ser. No. 271,578, Jun. 8, 1981, Pat. No. 4,370,292.

[51] Int. Cl.$^4$ ............................................. H01M 8/04
[52] U.S. Cl. ...................................... 429/15; 429/17; 429/51; 429/105; 429/109
[58] Field of Search ..................... 429/15, 14, 17, 19, 429/21, 50, 51, 105, 109, 101

[56] References Cited

U.S. PATENT DOCUMENTS 4,129,683 12/1978 Maricle .................................. 429/21
4,320,179 3/1982 Hart ....................................... 429/15

Primary Examiner—Brian E. Hearn
Assistant Examiner—Stephen J. Kalafut
Attorney, Agent, or Firm—Oldham & Oldham

[57] ABSTRACT

A hybrid redox-halogen energy storage device and system has a housing divided into two chambers by a microporous separator. Each chamber can contain an electrolyte such as $CrCl_3$. The microporous separator keeps the $C_r^{+2}$ ion in the chamber containing the negative electrode and also keeps chlorine gas ($Cl_2$) in the positive electrode chamber.

20 Claims, 1 Drawing Sheet

METAL-HALOGEN ENERGY STORAGE DEVICE AND SYSTEM

CROSS-REFERENCE

This is a continuation application of application Ser. No. 449,524, filed Dec. 13, 1982, abandoned which in turn is a continuation-in-part of our prior pending application bearing U.S. Ser. No. 271,578, filed June 8, 1981 for "A CHROME-HALOGEN ENERGY STORAGE DEVICE AND SYSTEM." now 4,370,292.

TECHNICAL FIELD

The present invention relates to a metal, for example, chrome, halogen gas energy storage device and system wherein a microporous membrane separates two half cell chambers. A metal cation such as chromium is dissolved in an electrolyte and exits in one chamber while a halogen gas, preferably chlorine is dissolved in an electrolyte contained in the remaining chamber. Both electrolytes can contain $CrCl_3$.

BACKGROUND ART

Heretofore, various energy storage systems have been utilized to store energy from such sources as electrical, solar, wind, water, and the like. However, many such systems are bulky, heavy, or have a low current density, or low energy efficiency, or other drawbacks.

One type of prior art energy storage device is a zinc-chlorine cell or battery. Various United States patents on such a device include U.S. Pat. Nos. 3,713,888; 3,809,578; 3,814,630; 3,993,502; 4,072,540; 4,127,701; 4,162,351; and 4,206,269. In this type of device, one electrode is actually made out of zinc. The other electrode is generally a porous material. The electrolyte is generally zinc chloride and no semi-permeable membrane separates the two electrodes. Upon charging of the cell, zinc metal is actually plated out upon a negative electrode substrate with chlorine gas being evolved at the positive porous electrode. Many of the above-noted patents relate to the use of the zinc-chloride cell within an automobile and also to the collection and containment of the chlorine gas by freezing and forming a hydrate at a temperature of less than minus 5° C.

U.S. Pat. No. 4,215,182 converts solar energy to chemical and electrical energy using a photoelectric-chemical membrane cell to regenerate the redox anolyte of a redox-oxygen cell. This patent is not pertinent in that it relates to three-phase electrodes, to teflon-bonded air diffusion cathodes, and to the use of oxygen, either venting it from the system or utilizing oxygen to combine with hydrogen to form water. Moreover, membrane 31 apparently is not an anionic membrane.

U.S. Pat. No. 4,192,910 to Frosch et al relates to a redox type cell having two compartments separated by a membrane. In one compartment a ferrous/ferric couple exits in a chloride solution, whereas the other cell has a chromic/chromous couple in the chloride solution. Upon charging of the cell, a thin layer of lead is deposited onto the negative electrode. This patent lacks any suggestion of the utilization of a chlorine compartment and it is known to the art that ferric ions tend to foul or plug the membrane.

U.S. Pat. No. 4,159,366 to Thaller also relates to a rebalance redox cell utilizing a hydrogen gas feed for one electrode, an ion permeable membrane, and an anode chamber containing ferric or ferrous ions. Thus, the anode chamber contains a gas. It is stated that one of the problems with an iron-chrome cell is the chromous ion is a strong reducing agent and can reduce the hydrogen ions contained in the anode fluid to hydrogen gas which creates an imbalance in the system and a limiting factor on the capacity of the cell. Hence, the rebalance cell serves to return capacity to the iron-chrome cell by electroc-chemically combining the hydrogen gas with the excess ferric ions. This cell is not rechargeable, hence the patent is not pertinent.

U.S. Pat. No. 4,128,704 to McKinzie et al relates to a photochemical energy storage system in which a source of oxygen serves as a feed gas to one electrode. In all, the system actually contains four electrodes and does not utilize a membrane, nor does it relate to applicants' hybrid type cell and hence is not pertinent.

U.S. Pat. No. 4,018,971 to Sheibley et al relates to special gels made from silica powders and hydrochloric acid which are impregnated onto a polymeric foam, with the resultant sheet utilized in a semi-permeable anionic membrane which permits chloride ions to be transported therethrough. The various types of cell combinations include iron and titanium or iron and chrome. However, no suggestion is made as to the utilization of an electrode containing saturated chlorine gas therein and the elimination of iron following the membrane.

U.S. Pat. No. 3,909,297 to Zietner et al relates to a lithium-chlorine fuel cell having a porous graphite cathode. The lithium salt is contained as a eutectic mixture of potassium chloride and lithium chloride which melts at about 359° C. and higher. The cell thus requires molten lithium which is continually oxidized in the molten electrolyte. Hence, this patent is not pertinent.

U.S. Pat. No. 3,540,933 to Boeke relates to a fuel cell combining at least two redox couple complexes of metallic elements having an equilibrium potential of not more than 0.8 volts apart from each other. Altough various types of cells are suggested, there is no suggestion of a chrome-chlorine cell and a ceramic membrane is utilized. It is further noted that this system relates to a once-passed through type system which amounts to a fuel cell as distinguished from a rechargeable redox system. Hence, it is not pertinent.

U.S. Pat. No. 3,540,934 also to Boek relates to a series of connected multiple redox cells by a non-conductive tubing having a ratio link to the inside tube diameter of at least 10 to 1. Hence, it is not pertinent.

U.S. Pat. No. 3,360,401 to Grasselli et al relates to a fuel cell wherein each electrode has a metal oxide coating thereon and wherein an intermediate electron transfer species is provided as a colloidal dispersion of a solid redox system in the electrolyte. The patent further relates to a gaseous oxidant reactant. Therefore, it is not pertinent.

U.S. Pat. No. 3,279,949 to Schaefer et al relates to a vanadium redox cell and hence is not pertinent.

U.S. Pat. No. 3,996,064 to Thaller relates to an electrochemical cell system containing switching means for applying a charging voltage from a source of non-continuous electrical power, for example solar energy, water level from a reservoir, and the like. The cell has a semi-permeable anion membrane, and basically relates to an iron-chrome type cell. Column 4 contains a statement that high oxidation-reduction potential should be avoided to permit hydrogen from being disassociated from the water and also possibly oxygen. No disclosure or suggestion is made to the use of an active anion electrolyte or of a dissolved neutral species, that is a dissolved gas-liquid phase system as in applicants' invention. Moreover, the iron usually fouls the membrane.

U.S. Pat. No. 4,129,683 relates to an anhydrous hydrogen-chlorine regenerative fuel cell and hence is not pertinent in that it does not contain any metal therein.

U.S. Pat. No. 4,320,179 relates to the purification of a halogen and an hydrohalic acid in electrochemical system through the utilization of a low halogen oxidation over voltage electrode in one compartment and a low halogen reduction over voltage electrode in a second compartment. Hence, this patent lacks any reference to the use of an electrolyte containing a metal therein.

DISCLOSURE OF INVENTION

It is therefore an aspect of the present invention to provide a metal-halogen energy storage device and system which has a microporous separator.

It is another aspect of the present invention to provide a metal-halogen energy storage device and system, as above, which has a high energy density.

It is still another aspect of the present invention to provide a metal-halogen energy storage device and system, as above, wherein said device can be utilized to store energy from various sources, for example, solar, wind, water energy, and can be further utilized to supply energy to various items such as automobiles, storage facilities, households, emergency power systems, and the like.

It is still another aspect of the present invention to provide a metal-halogen energy storage device and system, as above, wherein the metal can be chrome and does not plate out on the electrode.

It is another aspect of the present invention to provide a metal-halogen energy storage device and system, as above, wherein the membrane is not plugged or fouled by any of the reactants, and wherein a halogen gas is dissolved within one of the electrolytes.

It is yet another aspect of the present invention to provide a metal-halogen energy storage device and system, as above, wherein the electrodes are all porous or solid.

It is yet another aspect of the present invention to provide a metal-halogen energy storage device and system, as above, wherein said device or system has a long operation life, and also has a large depth of charge.

It is yet another aspect of the present invention to provide a metal-halogen energy storage device and system, as above, wherein a common compound exists in both electrolytes and wherein the operation temperature desirably is 60° F. or greater.

It is yet another aspect of the present invention to provide a metal-halogen energy storage device and system, as above, wherein the electrolytes are recirculated.

These and other aspects of the present invention will become apparent from the attached specification.

In general, a metal-halogen energy storage device, comprises: an electro-chemical cell, said cell having a microporous separator, said cell having a temperature of from about 0° C. to about 100° C.; a positive electrode and a negative electrode located in said cell, said microporous separator separating said positive electrode and said negative electrode and forming a chamber for each said electrode; a negative fluid, said negative fluid located in said negative electrode chamber, said negative fluid having ions therein selected from the group consisting of tin, titanium, vanadium, and chrome; and a positive fluid, said positive fluid located in said positive electrode chamber, said positive fluid having a halogen gas and halogen ions therein.

In general, a process for producing or storing electrical energy in an electrical storage device having a positive electrode compartment with a positive electrode therein, and a negative electrode compartment with a negative electrode therein, comprises the steps of: providing a microporous separator, separating said positive electrode compartment and said negative electrode compartment with said microporous separator; flowing a negative fluid containing ions selected from the group consisting of chromium, vanadium, titanium, and tin, past said negative electrode; flowing a positive electrode fluid containing a halogen gas and halogen ions past a positive electrode; and heating said storage device to a temperature of from about 0° C. to about 100° C.

BRIEF DESCRIPTION OF DRAWINGS

The invention will be better understood by reference to the attached drawings, wherein.

BEST MODE FOR CARRYING OUT THE INVENTION

The chrome-halogen energy storage device and system of the present invention is based upon a metal half cell reaction and a halogen half cell reaction. The metal half cell reaction will be represented by chrome, a preferred metal, although titanium, vandium, and tin can also be used. The halogen half cell reaction will be represented by chlorine, a preferred halogen, although fluorine, iodine, and bromine can also be used. Under discharge conditions, the chrome half cell reaction is $Cr^{+2} \rightleftarrows Cr^{+3} + e^-$ and the chlorine half cell reaction is $\frac{1}{2} Cl_2 + e^- \rightleftarrows Cl^-$, with the chlorine gas dissolved in an electrolyte. The reverse reactions occur on charge. The half cells are separated by a semi-permeable membrane which is pentrated by only anions.

Figure 1:
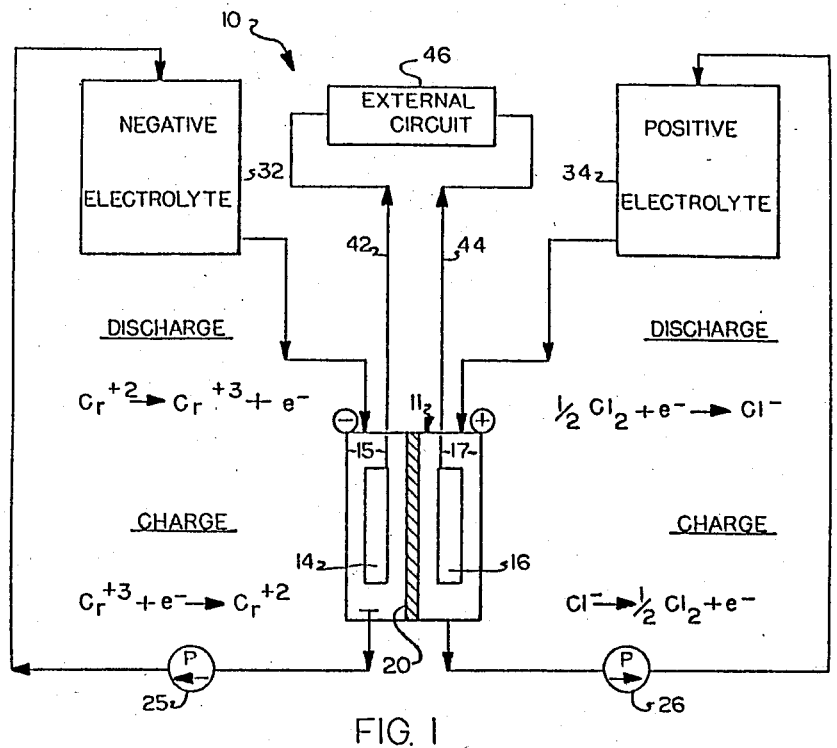
FIG. 1 is a diagram showing the energy storage system of the present invention.

A better understanding of the invention can be obtained from FIG. 1 wherein the device and system is generally indicated by the numeral 10. A housing generally indicated by the numeral 11 contains the chrome half cell and the halogen half cell. A negative electrode 14 is contained in chamber 15 which has an electrolyte therein, whereas a positive electrode 16 is contained in chamber 17 which has an electrolyte therein. The cells are separated by an anion-permeable membrane 20 which desirably has a protective porous coating 22 thereon. The electrolyte solution of chamber 15 is pumped by pump 25 to a negative electrolyte tank or storage area 32. Similarly, the electrolyte which is passed through chamber 17 is pumped via pump 26 to a positive electrolyte storage area 34. As indicated in FIG. 1, during discharge of the system, the chromous ion ($Cr^{+2}$) is oxidized to chromic ion ($Cr^{+3}$). The electrons donated by the oxidation reaction at electrode 14 is carried by lead wire 42 through an external circuit 46, then returned by lead wire 44 to electrode 16 in chamber 17.

The chlorine gas which is dissolved in the electrolyte is reduced to a chloride ion ($Cl^-$). The charge neutrality of both electrolytes is maintained by passage of the excess chloride ion in chamber 17 through the cell separators 20 and 22 and into chamber 15. During the charging of this system, the opposite reactions take place. That is, the chloride ion is oxidized and converted to chlorine gas with the chromic ion being converted to the chromous ion. Pumps 25 and 26 constantly cause the electrolyte to flow through the half cell chambers to effect an efficient supply of ions and reactant materials and thereby ensuring a high capacity system.

Figure 2:
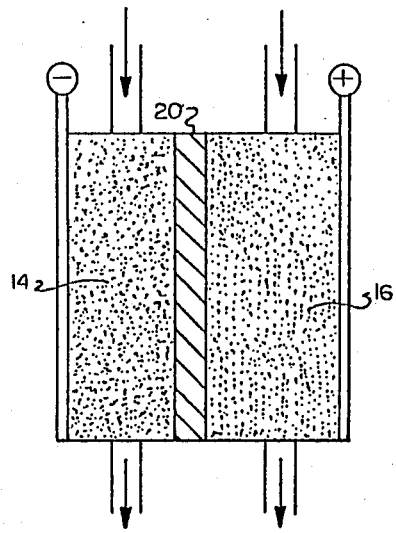
FIG. 2 is a cross-sectional view of a preferred cell of the present invention.

Referring now to the chrome or negative electrode, it can be made of a porous, non-reactive material such as titanium or coated titanium, but preferably is made of graphite or carbon. Desirably, the electrode is impregnated with a coating in order to catalyze the oxidation reaction. The chrome electrode desirably has a high surface area and thus may be in the form of a solid graphite base or substrate having a graphite or carbon felt, cloth, and the like thereon. Preferably, the chrome electrode is porous throughout and may occupy the entire half cell area as shown in FIG. 2. Additionally, a small amount of lead ion is placed in the electrolyte so that the lead is plated on the electrode surface to minimize coulombic losses due to pararsitic reactions such as proton reduction. In other words, a thin lead coating upon the negative or chrome electrode will prevent hydrogen gas from being evolved during the reduction or charging reaction. Lead may be added to the electrolyte as lead chloride. Upon discharging the battery, the lead will deplate and leave the activated surface exposed for the chrome ion oxidation reaction. Cadmium may be utilized in lieu of lead.

The negative electrolyte generally contains any tin ion, vanadium ion, titanium ion, or preferably a chrome ion, in the form of a salt, as from about 0.25 moles to about 4.0 moles and preferably from about 0.8 to about 3.0 moles per liter of solution, with about 1 mole being highly preferred. The preferred solvent is water. Generally, the chrome salt can be chrome chloride ($CrCl_3$), although the salt anion preferably should be of the same halide which is utilized in the other half cell, i.e., the positive electrode chamber. An amount of the compound which enhances the solubility of the metal ion, and imparts stability thereto, as well as increases the electrolyte conductivity may be utilized such as hydrochloric acid. The amount of acid can range from about 0.5 to about 10 moles, preferably from about 0.7 to about 2.0, and the highly preferred amount is about 1 mole per liter of solution.

The chlorine electrode is made of a suitable material such as graphite or carbon. Preferably, the positive electrode is porous and occupies the half cell area as shown in FIG. 2. In other words, it is a porous electrode. The electrode is also desirably treated in order to render it catalytically active with regard to the chlorine. In lieu of graphite or carbon, other materials, preferably porous, may be utilized such as ruthenized, iridized, or platinized (as a metal or metal oxide) valve metals such as titanium and tantalum.

The chlorine electrolyte contains dissolved chlorine gas, desirably from about 50 to about 100 percent of saturation with water as a preferred solvent. Higher amounts of saturation will often result in chlorine gas bubbles which reduces the efficiency of the half cell. The pressure of the half cell may range from about 1 atmosphere to about 10 atmospheres, with the preferred range being from about 1 to about 3 atmospheres. Various compounds are added to the chlorine electrolyte to balance the acid and chloride ion content of the chrome electrolyte. Thus, an amount of hydrochloric acid is added to balance the amount of hydrochloric acid in the chrome electrolyte. Moreover, an amount of a non-reacting salt is added to balance the chloride ion concentration in the chrome half cell. Specific examples include potassium chloride and lithium chloride, with sodium chloride being preferred. In lieu of chlorine gas, bromine, iodine, or fluorine may be utilized although chlorine is preferred.

Membrane 20 may be any type of cationic quaternary polyelectrolyte. The anion membranes are generally known to those skilled in the art and numerous commercial types are available. Three basic types of quaternary cationic polyelectrolytes include the quaternary ammonium polymers, the quaternary sulfonium, and the quaternary phosphonium polymers. Examples of the ammonium polymers include poly(meth)acryloxyalkyl, poly(meth)acrylamidoalkyl, polyalkenyl, and the like. Examples of sulfonium polymeres include polyacrylic, polyvinylbenzyl, polydiallyl, and the like. Examples of phosphonium polymers include polyvinyl, polyacrylate, and the like. Examples of specific membranes include the Ionac series produced by Ionac Chemical Corporation of New Jersey; the Neosepta series of membranes manufactured by the Tokuyama Soda Company, Ltd. of Japan; the Selemion series manufactured by the Asahi Glass Company, Ltd. of Japan, and the like. Due to the corrosive nature of the dissolved chlorine gas, it is desirable to apply an inert porous coating 22 to the membrane or cover the membrane with an inert porous material to prevent degradation thereof. Examples of suitable materials include polytetrafluoroethylene, polypropylene, polyethylene, and preferably polyvinylchloride.

The system of the present invention can be used for large scale storing of bulk energy, for example solar energy, wind energy, electrical energy storage, and the like. Furthermore, the system or device may be utilized for vehicle power as in trucks, buses, or automobiles, for an emergency power supply as for buildings, hospitals, and the like. Obviously, numerous uses exist as well known to those skilled in the art.

The operation of the device and system for discharge, that is supplying electrical energy to a device is as follows. The negative fluid or chromium electrolyte solution is supplied from negative fluid supply 32 to the chrome half cell. The chromous ion is oxidizes to a chromic ion with the loss of an electron. The electron is transferred by lead wire 42 through an external circuit 46 and returned by lead wire 44 to the positive electrode 16 where it unites with a chlorine gas molecule to yield a chloride ion. The anion permeable membrane prevents chemical shorting of cations and permits the passage of anions therethrough so that charge neutrality is maintained. In order to promote efficiency of the cell, the chrome half cell electrolyte is removed by pump 25 and is replenished by fluid from tank 32. Similarly, in the chlorine half cell, pump 26 continually removes the electrolyte with it being replenished by electrolyte from positive fluid storage tank 34. The system can be operated for any length of time so long as a suitable amount of dissolved chlorine gas and chromous ion exists in the respective tanks.

Upon charging of the system, electrical energy is supplied to the system by external circuit 46 as through electrode leads 42 and 44 connected respectively to the chrome electrode and the chlorine electrode. Upon charging of the system, the reverse half cell actions take place. That is, the chromic ion is reduced to the chromous ion and the chloride ion is oxidized to chlorine gas. In this situation, the fluid is circulated until a sufficient charge condition or state is obtained. The size of the system, including the various components therein such as the electrolyte tanks and the half cells, and the electrolytes therein, is governed by the application. However, in order to render the system efficient, the flow of the chrome or metal electrolyte, during discharge, initially varies from about 1 to about 20 and preferably from about 1.5 to about 2.0 times the stoichiometric amount of reactant required by the negative electrode reaction. Due to the depletion of the chromous ion, the flow rate during the discharge may vary depending upon the extent of use. The flow rate for the chlorine half cell during discharge is greater due to the fact that the chlorine is dissolved as a gas within the electrolyte of less solubility than the chrome ions. Nevertheless, a desirable flow rate is from about 1 to about 20 with a preferred flow rate being from about 2.0 to about 4.0 times a stoichiometric amount of reactant for the chlorine reduction reaction. The same flow rate considerations should be given to charging the battery. However, since the reactant for the positive electrode reaction in this case will be chloride ion, the actual flow rate could be considerably lower. From an energy efficiency standpoint, varying the flow rate during discharge and charge is preferred. However, from an operational point of view, a constant flow rate may be desirable. In this case, the flow rate of both electrolytes will be governed by stoichiometric requirements for reactants established by practical conditions at the practical full state of discharge and the practical full stage of charge.

The system can generally operate over a wide temperature range, from about the freezing temperature of the electrolyte, that is about 0° C., to about the boiling temperature, that is about 100° C., and preferably from about 30° C. to about 60° C. Generally, increasing temperature will increase the voltaic efficiency, but will decrease the coulombic efficiency.

The advantages of the present invention should be apparent. That is, since a discharge potential between the chromous-chlorine reaction is 1.77 volts, good cell voltage and hence good power densities are obtained. Furthermore, there are no plating reactions which tie up the electrode and thus there is no cycle life limitation. Since the positive electrolyte only contains cations such as protons and sodium or potassium or etc., the cell has a permanent life without requiring the replenishment of the entire electrolytes. Moreover, any chrome ions which migrate through the membrane and into the positive electrolyte may be easily recovered. All that is required is that a sufficient amount of a base be added to neutralize, that is, render the positive electrolyte basic whereupon a precipitate is obtained which is chromic oxide or hydroxide. The precipitate is removed with the positive electrolyte being rendered acidic. The precipitate is then acidified and added back to the negative electrolyte with no loss of chromic ion and hence no disposal problems, environmental problems, EPA problems, and the like. The type of base which may be utilized generally includes metal hydroxides, usually of the same metal cation of the non-reacting salt added to the positive electrolyte with specific examples being KOH, LiOH, and NaOH. Usually, the pH of the electrolyte is changed to at least 6 and preferably to at least 8. Another distinct advantage of the present invention is that the halogen gas, for example, chlorine, will not foul the membrane, thereby causing a high membrane resistance and consequently a loss in energy storage efficiency with the pendant problems of periodically cleaning the membrane and the like. Moreover, the present invention is capable of independent sizing of energy storage capacity and of desired power delivery.

The current density of the present invention can range from about 20 to about 60 milliamps per square centimeter of apparent electrode area with about 40 milliamps plus being readily obtained. The coulombic efficiency is generally in excess of 90 percent, with the voltaic efficiency being in excess of 50 percent and often 60 percent. The product of the voltaic and coulombic efficiency is the total energy efficiency which is often in excess of 60 percent. Thus, it should be apparent that a highly desirable useful pragmatic and suitable energy storage device has been described. The invention will be better understood by reference to the following examples.

EXAMPLE

A hybrid redox-halogen energy storage device was made as set forth hereinabove according to the following specifications.

| | |
|---|---|
| CHROME ELECTROLYTE: | 1 M $CrCl_3$ <br> 1 N HCl <br> 5 drops of Saturated $PbCl_2$ in aqueous solution <br> 45 ml total volume <br> Flow rate of 15 ml/min (1.5 times stoichiometric at 95% state or charge or discharge) |
| CHLORINE ELECTROLYTE: | 3 M NaCl <br> 1 N HCl <br> Saturated $Cl_2$ (2-3 gpl) <br> 1 liter total volume <br> Flow rate of 84 ml/min (4.5 times stoichiometric on discharge) |
| CHROME ELECTRODE: | ⅛ inch thick carbon felt (Fiber materials, Biddeford, Me) impregnated with 20 μg of gold per square centimeter of superficial area. The felt did fit snugly between the membrane separator and the solid graphite block which was at the back wall of the cell. The graphite block serves as a current collector. Electrolyte flow was perpendicular to the flow of current. |
| CHLORINE ELECTRODE: | ⅛ inch thick porous carbon (PC-25, Union Carbide Corporation) pretreated by boiling in concentrated nitric acid for 48 hours. The carbon extended through one side of the cell so that a current lead could be attached to it. The electrolyte flow was parallel to the flow of current. |
| ANION MEMBRANE SEPARATOR: | Copolymer of vinylbenzyl chloride and dimethylaminoethyl methacrylate (Ionics, Inc., Watertown, Mass.) |

The hybrid redox-hydrogen energy storage device gave the following results.

TABLE I

| | A | B | C | D |
|---|---|---|---|---|
| A. Chrome Electrolyte Temperature °C. | 24 | 24 | 24 | 30 |

TABLE I-continued

|   | A | B | C | D |
|---|---|---|---|---|
| B. Chlorine Electrolyte Temperature °C. | 26 | 26 | 26 | 33 |
| C. Current Density* ma/cm² | 40 | 40 | 40 | 40 |
| D. Average charge voltage, volts | 2.09 | 2.13 | 2.16 | 2.06 |
| E. Average discharge voltage, volts | 1.25 | 1.25 | 1.21 | 1.18 |
| F. Charge time, Min.** | 72 | 48 | 41 | 68 |
| G. Discharge time, Min. | 68 | 48 | 40 | 67 |
| H. $VE^1 = \frac{E}{D} \times 100, \%$ | 60 | 57 | 56 | 57 |
| I. $CE^2 = \frac{G}{F} \times 100, \%$ | 94 | 100 | 98 | 99 |
| J. $EE^3 = H \times I/100, \%$ | 56 | 57 | 55 | 56 |

*Superficial electrode and membrane area was 20 cm²
**Represents the total time of charge until hydrogen gasing was observed (which also was apparent in the cell voltage). The charge time became less with cycle number because of electrolyte leakage (which was replaced with distilled water only).
[1]Voltaic efficiency
[2]Coulombic efficiency
[3]Energy efficiency During the charging of the system, chlorine gas will be generated and usually stored in the positive fluid storage tank. In order to compensate for the amount of space required for the chlorine gas, any system or means may be utilized whereby the chlorine is formed into a condensation state. For example, chlorine octahydrate, $Cl_2.8H_2O$, whereby, at low temperature, for example approximately 10° C. to about −15° C., the hydrate may be frozen. This aspect permits a large amount of chlorine gas to be stored in a small amount of space. Upon need of the chlorine gas, the hydrate may be heated to release a sufficient amount of gas which is then dissolved in the electrolyte and supplied to the half cell. Such features does not constitute a part of the present invention but is noted in that it constitutes a space-saving feature.

It has now been found that the life of the energy storage device can be greatly extended by the utilization of a microporous separator 20 in lieu of an anionic membrane. The neutral or inert type microporous separator or membrane is generally made out of inert substances such as polyethylene, polypropylene, polyvinylchloride, teflon, and the like. Such types of membranes are generally commercially available such as Daramic, manufactured by W.R. Grace Company, a porous polyethylene membrane; microporous separators, manufactured by Amerace Copr., porous polyvinylchloride type membranes, Celgard, manufactured by Celanese Corp., porous polypropylene type membranes, and the like. Generally, the pore size of the various microporous membranes ranges from about 0.0005 microns to about 0.5 microns and preferably from about 0.1 microns to about 0.8 microns.

The negative discharge cell can have the same type of metals as before, that is titanium, vanadium, tin, with chromium being preferred. Moreover, the negative electrolyte contains the same types of compounds, for example $CrCl_3$ in the amounts as set forth above.

Another aspect of the present invention is that the salt utilized in the electrolyte in both cells is the same. That is, the positive electrolyte instead of containing a non-reactive salt such as sodium chloride, potassium chloride, lithium chloride, etc., can also contain chrome chloride, that is $CrCl_3$. The amount of the chrome chloride salt in the positive electrolyte can be the same as in a negative electrolyte, that is from about 0.25 to about 4 moles, desirably from about 0.8 to about 3 moles, with approximately 1 mole per liter of solution being preferred. Should different metals other than chrome be utilized in the negative electrolyte, a corresponding salt can be utilized, for example vanadium chloride, titanium chloride, and the like. Otherwise, the positive electrolyte is the same as set forth above.

The microporous membrane has the ability to retain the chromous ($Cr^{+2}$) ion in the negative electrolyte or half cell, as well as to keep the chlorine gas in the positive electrolyte or cell. Although very small amounts of such compounds may occasionally bleed through or leak through the membrane, they are effectively blocked such that the half cell reactions are unimpeded and thus the overall system has a high efficiency.

Other than the use of an inert microporous separator and the use of any common electrolyte compound in both half cells, various other aspects of the present invention are the same as set forth above, except that plainer or solid electrodes can be utilized in lieu of a porous electrode. Solid electrodes are known to the art and generally have a rough or serrated surface and typically are made out of carbon or graphite. Although the energy storage device or system can be operated at a temperature of from between 0° C. to 100° C., a desirable temperature is in excess of 60° C., for example from 60° to 100°, with from about 60° to about 80° C. being preferred. It has been found that at temperature in excess of 60° C., much improved efficiencies are obtained. The exact reason is not known, but it is thought that the chrome ion forms a hexahydrate which is slow reacting. However, at temperatures of 60° C. or greater, the complex changes to a monochloropentahydrate which reacts at a faster rate. Moreover, it is noted that if one cell is pressurized, the remaining cell should be pressurized to the same pressure. Otherwise, the electrolyte will flow through the microporous separator.

According to the present invention, a much greater depth of charge can be utilized. That is, whereas before, the range of the reactive chrome concentration was from only about 0.2 to about 0.8 moles per liter of solution, the range is now from about 0.05 to about 0.95 moles per liter of solution. Thus, greater utilization of the reactants is possible.

The device is operated as before with the respective solutions being supplied to the respective half cells in a manner as shown in FIG. 1. The charging or discharging of the respective half cell is generally the same as before, as are the flow rates corresponding to the operating current. Although a different membrane is utilized, the microporous separator has been found not to be as unstable as the anionic membrane and thus can operate for a much longer period of time. As will be apparent from the following examples, various efficiencies are still generally very similar, and in some cases even higher. The utility of the present invention still relates to use in various large operations such as buildings, hospitals, electrical generating plants, and the like.

The present invention will be better understood by reference to the following examples.

EXAMPLES

A hydrid-redox halogen energy storage device was made as set forth hereinabove according to the following specifications.

| CHROME ELECTROLYTE: | 1 M $CrCl_3$ |
|---|---|
| | 1 N HCl |
| | 5 drops of saturated $PbCl_2$ in aqueous solution |

-continued

| | |
|---|---|
| | 45 ml total volume flow rate of 15 ml/min (1.5 times stoichiometric at 95% state or charge or discharge) |
| CHLORINE ELECTROLYTE: | 1 M CrCl$_3$<br>1 N HCl<br>Saturated Cl$_2$ (2–3 gpl)<br>250 milliliter total volume<br>Flow rate of 84 ml/min (4.5 times stoichiometric or discharge) |
| CHROME ELECTRODE: | ⅛ inch thick carbon felt (fiber materials, Biddeford, Me) impregnated with 20 μg of gold per square centimeter of superficial area. The felt did fit snugly between the membrane separator and the solid graphite block which was at the back wall of the cell. The graphite block serves as a current collector. Electrolyte flow was perpendicular to the flow of current. |
| CHLORINE ELECTRODE: | ⅛ inch thick carbon felt (fiber materials, Biddeford, Me) impregnated with 20 μg of gold per square centimeter of superficial area. The felt did fit snugly between the membrane separator and the solid graphite block which was at the back wall of the cell. The graphite block serves as a current collector. Electrolyte flow was perpendicular to the flow of current. |
| MICROPOROUS MEMBRANE SEPARATOR: | Daramic microporous separator manufactured by W. R. Grace Co. - porous polyethylene, pore size of 0.05μ diameter. |

The hybrid redox-halogen energy storage device gave the following results.

TABLE II

| | A | B | C |
|---|---|---|---|
| A. Chrome Electrolyte Temperature °C. | 59 | 59 | 59 |
| B. Chlorine Electrolyte Temperature °C. | 59 | 59 | 59 |
| C. Current Density* ma/cm$^2$ | 40 | 40 | 40 |
| D. Average charge voltage, volts | 2.010 | 1.996 | 1.922 |
| E. Average discharge voltage, volts | 1.239 | 1.192 | 1.317 |
| F. Charge time, Min.** | 90 | 97 | 93 |
| G. Discharge time, Min. | 84 | 84 | 85 |
| H. $VE^1 = \frac{E}{D} \times 100, \%$ | 60 | 60 | 67 |
| I. $CE^2 = \frac{G}{F} \times 100, \%$ | 93 | 87 | 91 |
| J. $EE^3 = H \times I/100, \%$ | 56 | 52 | 61 |

*Superficial electrode and membrane area was 20 cm$^2$
**Represents the total time of charge until hydrogen gasing was observed (which also was apparent in the cell voltage). The charge time became less with cycle number because of electrolyte leakage (which was replaced with distilled water only).
[1] Voltaic efficiency
[2] Coulombic efficiency
[3] Energy Efficiency Comparing Table II with the results of Table I, it can be readily seen that the use of a microporous separator yields at a higher voltaic efficiency. Moreover, the cell has a greater energy storage efficiency and will operate for a much longer period of time due to the inert microporous separator. Moreover, greater utilization of the reactants is possible with this type of cell.

While in accordance with the patent statutes, a preferred embodiment and best mode have been presented, the scope of the invention is measured by the scope of the attached claims.

What is claimed is:

1. A metal-halogen energy storage device, comprising:
   an electro-chemical cell, said cell having a microporous separator, said cell having a temperature of from about 0° C. to about 100° C.;
   a positive electrode and a negative electrode located in said cell, said microporous separator separating said positive electrode and said negative electrode and forming a chamber for each said electrode;
   a negative fluid, said negative fluid located in said negative electrode chamber, said negative fluid having ions therein selected from the group consisting of tin, titanium, vanadium, and chrome; and
   a positive fluid, said positive fluid located in said positive electrode chamber, said positive fluid having a halogen gas and halogen ions therein.

2. A metal-halogen energy storage device, according to claim 1, including a means for continuously moving said positive fluid through said positive electrode chamber, including a means for continuously moving said negative fluid through said negative electrode chamber, and wherein said positive fluid gas is chlorine, and the amount of said chlorine in said fluid ranges from about 50 percent to about 100 percent of saturation of said chlorine gas dissolved therein.

3. A metal-halogen energy storage device, according to claim 2, wherein said negative and said positive fluid has metal ions therein, the amount of said metal ions ranging from about 0.25 to about 4.0 moles per liter of solution, wherein the pressure in said positive and said negative electrode chamber ranges from about 1 atmosphere to about 10 atmospheres, and wherein said microporous membrane has an average pore size ranging from about 0.005 microns to about 0.5 microns.

4. A metal-halogen energy storage device according to claim 3, wherein said negative fluid ions are chromous ions and chromic ions, wherein said positive fluid ions are chromic ions, and wherein the amount of said chromium ions ranges from about 0.8 to about 3.0 moles per liter of solution.

5. A metal-halogen energy storage device according to claim 3, wherein said positive electrode and said negative electrode are porous or solid, and wherein the temperature of said cell ranges from about 60° C. to about 100° C.

6. A metal-halogen energy storage device according to claim 4, wherein said negative fluid ions are chromous ions and chromic ions, wherein said positive fluid ions are chromic ions, and wherein the amount of said chromium ions ranges from about 0.8 to about 3.0 moles per liter of solution.

7. A metal-halogen energy storage device according to claim 6, wherein the flow rate of said negative and said positive fluid ranges from about 1.0 to about 20.0 times the stoichiometric amount required for a complete reaction, wherein the average pore size of said microporous membrane ranges from about 0.01 microns to about 0.08 microns, and wherein the pressure in said positive and said negative electrode chamber ranges from about 1 atmosphere to about 3 atmospheres.

8. A metal-halogen energy storage devcie according to claim 7, wherein said positive electrode and said negative electrode are porous and occupy substantially the entire chanber area and are made of graphite or carbon so that said fluid flows through said electrode, and wherein said separator is a material selected from the group consisting of polyethylene, polypropylene, polyvinylchloride, polytetrafluoroethylene, and combinations thereof.

9. A metal-halogen energy storage device according to claim 8, wherein the flow rate of said negative fluid ranges from about 1.5 to about 2.0 and wherein the flow rate of said positive fluid ranges from about 2.0 to about 4.0.

10. A metal-halogen energy storage device according to claim 9, wherein said negative electrode contains an acid, the amount of said acid ranging from about 0.5 to about 10 moles per liter of solution, and wherein said positive electrolyte contains an acid, the amount of said acid ranging from about 0.5 to about 10 moles per liter of said solution.

11. A metal-halogen energy storage device according to claim1 wherein the microporous separator is inert relative to the electrolytes.

12. A process for producing or storing electrical energy in an electrical storage device having a positive electrode compartment with a positive electrode therein, and a negative electrode compartment with a negative electrode therein, comprising the steps of:
providing a microporous separator, separating said positive electrode compartment and said negative electrode compartment with said microporous separator;
flowing a negative fluid containing ions selected from the group consisting of chromium, vanadium, titanium, and tin, and past said negative electrode;
flowing a positive electrode fluid containing a halogen gas and halogen ions past a positive electrode; and
heating said storage device to a temperature of from about 0° C. to about 100° C.

13. A process according to claim 12, including flowing said negative fluid from said negative electrode compartment to an electrolyte storage tank, and circulating said negative fluid from said negative electrolyte storage tank back to said electrode, and flowing said positive fluid from said positive electrode compartment to a positive electrolyte storage tank, and circulating said positive electrolyte from said positive electrolyte storage tank back to said positive electrode compartment.

14. A process according to claim 13, wherein said microporous membrane has an average pore size ranging from about 0.0005 microns to about 0.5 microns, wherein the amount of said negative fluid passing through said negative electrode ranges from about 0.25 to about 4.0 moles of said metal ions per liter of solution, wherein the amount of positive electrode fluid passing through said positive electrode contains an amount of chlorine of from about 50 percent to about 100 percent of saturation in said fluid, and including pressurizing said positive fluid in said positive electrode compartment and said negative fluid in said negative electrode compartment to a pressure of from about 1 atmosphere to about 10 atmospheres.

15. A process according to claim 14, wherein said electrodes are porous or solid, wherein the amount of said negative fluid ranges from about 1.0 to about 20.0 times the requirement by stoichiometric of reaction, and wherein the amount of said positive fluid ranges from about 1.0 to about 20.0 times the requirement by stoichiometric of reaction, and wherein said temperature is from about 60° C. to about 100° C.

16. A process according to claim 14, wherein said negative fluid contains chromic and chromous ions, wherein said positive fluid contains chromic ions, chlorine gas, and chlorine ions.

17. A process according to claim 15, wherein said negative fluid contains chromic and chromous ions, wherein said positive fluid contains chromic ions, chlorine gas, and chloride ions.

18. A process according to claim 17, wherein said electrodes are porous and occupy substantially all of said electrode compartment so that said negative fluid or said positive fluid flows through said electrode, and wherein said separator is a material selected from the group consisting of polyethylene, polypropylene, polyvinylchloride, polytetrafluoroethylene, and combinations thereof.

19. A process according to claim 18, wherein the amount of chromium ions in said negative electrolyte and said positive electrolyte ranges from about 0.8 to about 3.0 moles per liter of solution, and wherein said positive and said negative electrode compartment pressure ranges from about 1 atmosphere to about 10 atmospheres.

20. A process according to claim 19, including flowing said negative fluid at a rate of from about 1.5 to about 2.0, flowing said positive fluid at a rate of from about 2.0 to about 4.0, and including adding an acid to said negative electrolyte, the amount of said acid ranging from about 0.5 to about 10 moles per liter of solution, and including adding an acid to said positive electrolyte, wherein the amount of said acid ranges from about 0.5 to about 10 moles per liter of solution.

* * * * *